UNITED STATES PATENT OFFICE.

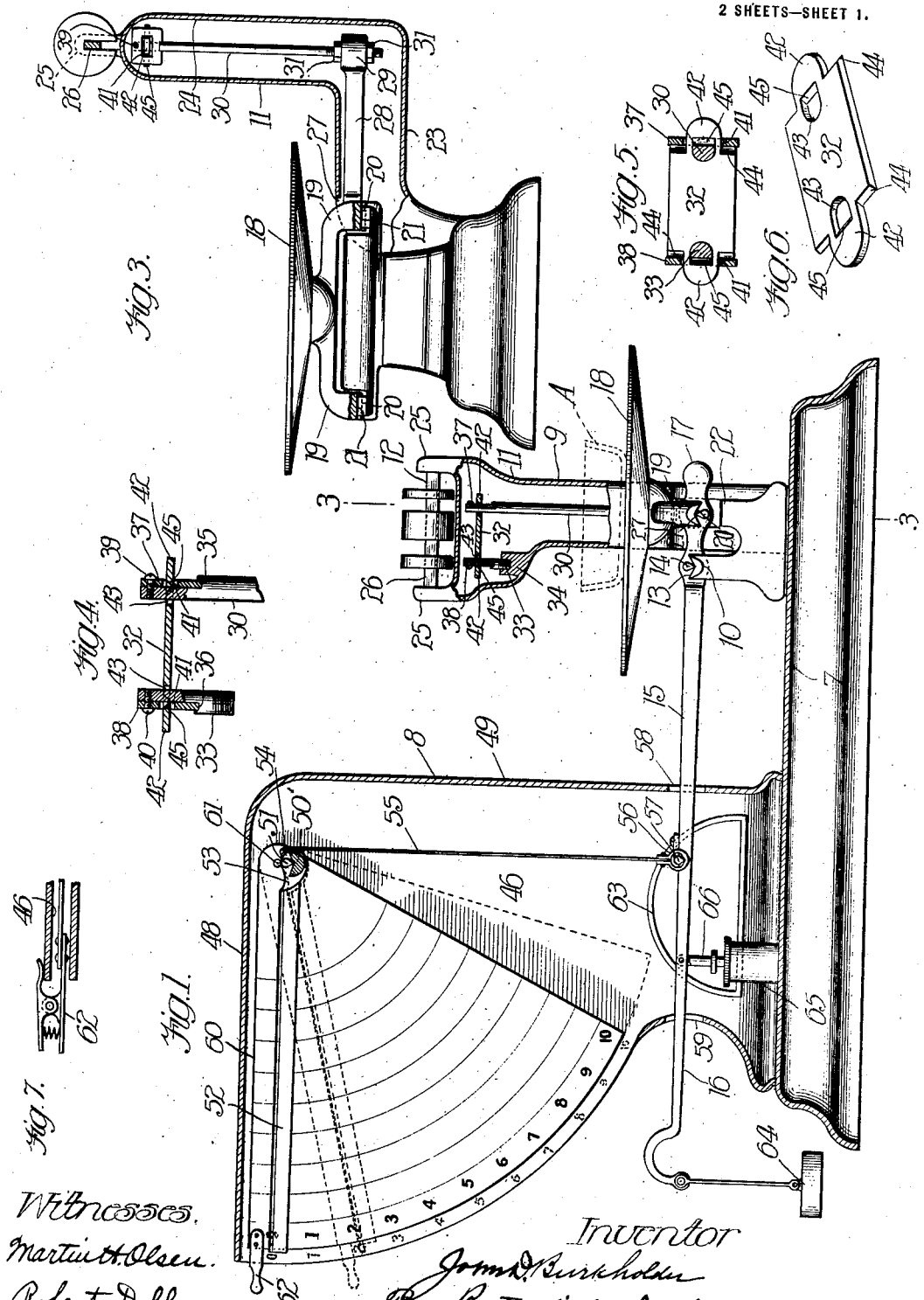

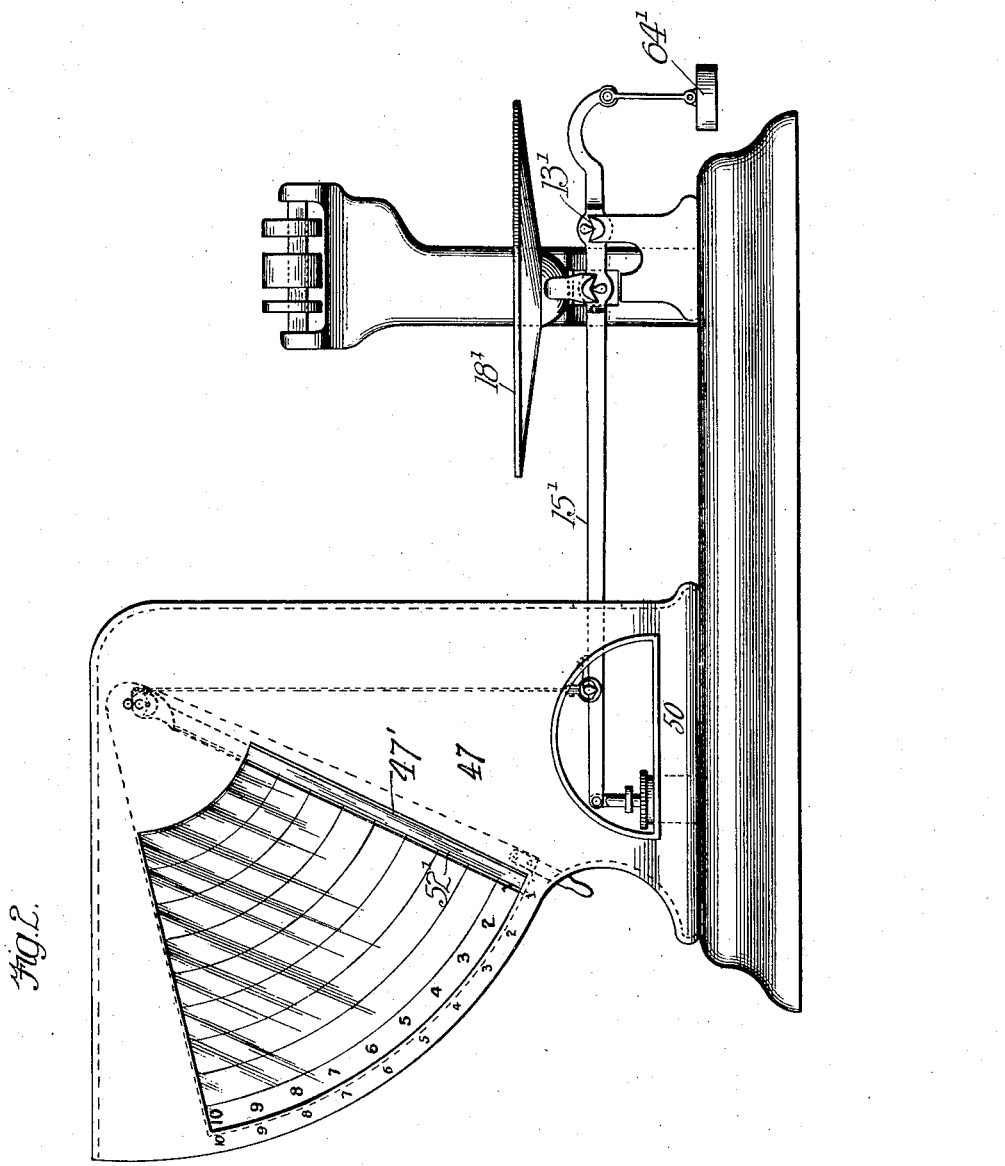

JOHN D. BURKHOLDER, OF LANCASTER, PENNSYLVANIA, ASSIGNOR TO TOLEDO SCALE COMPANY, OF JERSEY CITY, NEW JERSEY, A CORPORATION OF NEW JERSEY.

SCALE.

1,167,974. Specification of Letters Patent. Patented Jan. 11, 1916.

Application filed June 12, 1911. Serial No. 632,714.

*To all whom it may concern:*

Be it known that I, JOHN D. BURKHOLDER, a citizen of the United States, residing at Lancaster, in the county of Lancaster and State of Pennsylvania, have invented certain new and useful Improvements in Scales, of which the following is a specification.

My invention relates more particularly to a construction of scale in which the platform may be mounted in a position but little elevated above the base, thereby facilitating the deposit of commodities to be weighed upon the scale pan or platform and their removal therefrom.

Scales of the character to which my invention relates embody a suitable base and a scale beam pivoted upon the same and carrying a scale pan which is pivoted thereto and a counterbalancing device of some character. Since the scale pan is pivoted upon the beam, provision must be made for retaining it in its horizontal position and this is ordinarily accomplished by what is known as a check or check bar consisting of a link pivoted to the support and to the scale pan to form with the beam a substantially parallel motion device. Customarily this check is mounted below the scale pan and in order to provide the leverage necessary to avoid too great friction on the bearings the link or check bar is pivoted to the frame and to a bracket extending below the scale pan a considerable distance. This construction, however, requires that the scale pan shall be correspondingly elevated, with the attendant disadvantage in loading and unloading the pan. It has been proposed to obviate this objection by what is known as a raised check consisting of an arm rigid with the scale pan and extending parallel to and above the beam a suitable distance and then upwardly in a substantially vertical direction, the upper end being connected by a link to the frame similarly to the link in the check mechanism heretofore described. This construction, however, requires the use of round pivots and bearings between the link and the framework and arm, respectively, and also puts a considerable strain upon these pivots, especially when the commodity being weighed is not centrally located upon the scale pan, with the result that considerable friction is developed in the bearings and also side strain upon the knife edge bearings of the beam and scale pan, thus materially lessening the delicacy of the instrument. For this reason the raised check bar has been but little used.

It is the object of my invention to attain the advantages of the raised check bar without forfeiting the advantages of the depressed check bar and with this object in view my invention consists in the construction of check bar hereinafter described and in the other features pointed out in the following claims.

While in the description I have set out the specific features of preferred forms of my device with great particularity, it will be evident that my invention is not limited to the precise features and combination and arrangement of parts described but includes all constructions embodying the principle thereof as set out in the claims.

The drawings attached to this specification and forming a part hereof illustrate two preferred modifications.

In Figure 1 the invention is shown as applied to a scale in which the scale pan and counterbalancing mechanism are on opposite sides of the beam fulcrum, whereas in Fig. 2 the invention is shown applied to a scale in which the counterbalancing mechanism and scale pan are upon the same side of the fulcrum of the beam. Fig. 1 represents a scale partly in vertical section and partly in elevation, and Fig. 2 an elevation of a modified form of the invention, parts being shown in dotted lines; Fig. 3 is an elevation partly on vertical section at right angles to the plane of Fig. 1 upon the line 3—3 of the latter figure; Figs. 4, 5 and 6 are details, Fig. 4 being shown partially in vertical section, Fig. 5 in horizontal section, Fig. 6 in perspective, and Fig. 7 is a detail of a portion of the apparatus to be described later. These figures will be described more in detail later on.

The preferred embodiment of my invention is illustrated in Fig. 1, in which the frame consists of a base 7, an indicator housing 8 and a casting 9 which provides supports 10 for the beam fulcra, a housing 11 for the check mechanism and a rack or support 12 for the auxiliary weights. The fulcra 10 may be provided with the usual agates 13 for the knife edges 14 of the beam 15. The latter is formed with a long arm 16 and a short arm 17, with the former of which is connected the counterbalancing means and upon the latter is pivoted the scale pan 18 by means of downwardly extending brackets or arms 19, which in turn are provided at their lower ends with agate seats 20 for the reception of the knife edges 21 upon the beam. In Fig. 3 the brackets 19 are shown broken away to reveal this structure, though it is substantially of the ordinary type and constitutes no part of the present invention. As shown in Fig. 1, the casting 9 is also provided with an upwardly projecting stop 22 to limit the downward movement of the short end of the beam. A hollow rectangular extension 11 consisting of the horizontal part 23 and vertical part 24 provides a housing for the check as before stated and is formed at its upper end into a pair of projecting posts or standards 25, which support between them a rod or bar 26 upon which the detachable weights for the scales may be mounted, these weights being of the usual slotted disk form. The horizontal branch 23 of the casting presents an opening 27 opposite the adjacent bracket 19 of the scale pan and this bracket is formed with a horizontal projecting arm 28 which extends into the casting and is perforated at its free end 29 for the reception of a vertical post 30, the latter being threaded at its lower end and provided with nuts 31 by which it is secured in adjusted position in a perforation in the arm 28. At its upper end the post 30 is provided with a bearing for one end of a check link 32 which at its other end engages a stationary post 33 threaded into a boss 34 in the interior of the hollow casting 11. In the particular construction the movable and stationary posts 30—33 are each cut away upon the side remote from the other at 35 and 36, respectively, for the reception of plates 37 and 38, which are secured thereto by screws 39—40. The plates just described are each provided with a perforation 41, through which perforations extend the lugs 42 upon the check link. As shown more particularly in Fig. 6, the latter takes the form of a thin plate generally oblong in outline, having the lugs 42 projecting from opposite ends thereof and openings 43 through which pass the cut-away portions of the posts 30—33. The shorter edges of the link are chamfered at 44 to form knife edges (see Figs. 4 and 6) and the outer edges of the openings 43 are likewise chamfered along straight edges 45—45, these walls of the openings being located with reference to the chamfered ends of the link so that the knife edges on each end of the link and within the corresponding opening 43 are accurately alined so that they may constitute in effect a single axis or pivot. In assembling this part of the scale the link is first placed with its openings embracing the posts 30—33 and the plates 37—38, then adjusted and secured in place. The knife edges 44 upon the ends of the link then engage the adjacent faces of the plates 37—38, while the knife edges in the openings 43 engage the remote faces of the posts 30—33, but the knife edges at each end of the link being accurately in line there is no binding of the parts. The post 30 is so positioned as to bring the bearing thereon in the same transverse plane with the knife edge 21 which supports the scale pan and the stationary post 33 is so positioned as to bring the knife edge bearing thereon in line with the knife edge of the beam 15. It follows from this structure that the beam and check link together with their mountings form a true parallel motion device in which only knife edge bearings need be employed and in which any desired leverage may be had between the bearing of the scale pan and that of the check link, unnecessary pressure and consequently friction being at the same time avoided. Of course it will be apparent that this structure could be used without employing knife edges but the latter are desirable on account of their superior delicacy.

The specific form of indicating mechanism which I have shown forms *per se* no part of the present invention but constitutes subject matter of a separate application No. 591,678 filed November 8, 1910. For the purposes of the present application it may be described as follows: The indicator housing 8 includes a pair of generally quadrant-shaped side walls 46—47 connected at their straight edges by a top wall 48 and end wall 49, the end and side walls being formed at their lower end into a suitable standard 50 for supporting the housing. Near the angle of the top and end walls are provided bearings 50′ for the knives 51 of a combined pendulum and indicator 52. The latter has formed integral therewith a cam segment 53 to which is attached at 54 a flexible band 55 of steel or other suitable material which is provided at its other end with stirrups 56 engaging knife edges 57 upon the beam 15, the latter extending through openings 58 and 59 formed in the indicator housing for this purpose. The pendulum 52 is so weighted in view of its proportions and attachment to the beam that it exactly balances the beam system when the pendulum is in its uppermost position, which is therefore its zero point. The sector-shaped chart 60 is also pivoted within the indicator casing as nearly as may be concentric with the pendulum, as at 61, and carries at its upper free corner a clip 62 by which it may be set in angular position throughout a considerable range, the clip engaging one of the curved side walls for this purpose. The chart bears along its curved edge a series of numerals indicative of the various weights and upon the edge of one of the side walls of the casing is arranged a similar series of numerals. The purpose of the movable chart is to take out tare. Thus when a body of a commodity is to be weighed the receptacle, as A, is placed upon the scale pan and the position of the pendulum indicator noted. The chart is then moved so that its zero indication will again register with the index on the pendulum. The commodity to be weighed is then placed in the receptacle and the index will then indicate upon the chart the true weight of the commodity irrespective of the vessel employed, and the weight of the vessel is of course indicated by the position of the zero indication of the chart with reference to the zero on the stationary housing. Obviously the proper side wall of the housing must be cut away in order to read the chart and if the latter is a computing chart having a series of concentric rows of computations, as indicated in the drawing, the opening will be substantially sector-shaped. In Fig. 2 the wall 47 is shown as provided with such an opening 47', through which the chart and indicator may be observed. For convenience in getting at the connections of the beam an opening is also formed in the lower part of the housing as shown at 63, Fig. 1. As heretofore stated, the beam extends through the indicator housing and at the outer end of the long arm it carries the usual pendant 64 upon which may be placed additional weights from the rack 12 when it is desired to weigh bodies of commodities which are beyond the range of the scale. Within the indicator housing, as at 65, is provided a dash-pot, the piston of which is connected to the beam 15 by a rod 66 and which functions in the well-known manner to prevent violent movement of the beam.

As heretofore stated Fig. 2 shows my invention applied to a somewhat different form of scale. In this modification the beam 15' is fulcrumed at 13' and carries the scale pan 18' upon the same side of its pivot to which the indicator mechanism is connected. The indicating mechanism is substantially similar to that described in connection with Fig. 1 and the pendulum 52' is attached in the same manner to the beam 15'. However, the distribution of weights and connections is such that the pendulum counterbalances the beam system when in its lowermost position and rises as weight is added to the scale pan and thereby increases its counter-balancing effect. The numerals upon the chart and upon the edge of the casing wall must be reversed, that is to say they must increase from below upward instead of decreasing as in the chart described in Fig. 1. The modification of Fig. 2 further differs from that in Fig. 1 in that the pendant 64 for receiving the removable weights from the rack when it is desired to weigh a body heavier than the chart alone will take care of, is suspended from a short arm extending from the beam at the opposite side of its fulcrum from that which is connected to the scale pan and counterbalancing mechanism. The check bar mechanism is connected up to the scale pan in precisely the same way as in the earlier described modification, the check posts occupying similar positions with relation to the fulcrum of the beam and pivots of the scale pan. The positions of the fulcra and scale pan pivots being, however, in the present modification the reverse of that shown in Fig. 1, the positions of the check posts are correspondingly reversed. The operation of the scale in each form will now be apparent. In that form of the device which is shown in Fig. 1 the pendulum tends to raise the end to which it is attached and thereby depresses the end of the beam which bears the scale pan. As the scale pan is lowered, however, by the addition of weight such as of the commodity to be weighed, the pendulum is lowered and thus its tendency to raise the beam is diminished, the effect being the equivalent of adding weight to the beam. With the modification shown in Fig. 2, on the other hand, weight added to the scale the pan tends to depress the end of the lever connected to the pendulum and raise the latter, thereby increasing the counter-balancing effect thereof.

It will now be apparent that in my improved form of scale I obtain all the advantages of a raised check bar by removing the same from beneath the scale pan to a position above the same without incurring any of the disadvantages which have been pointed out in connection with the raised check heretofore suggested.

What I claim is:

1. In a device of the class described a beam, a frame upon which the beam is fulcrumed, a scale pan pivotally mounted on the beam, a bracket extending from the scale pan laterally of the beam and a link pivoted to the bracket and to the frame.

2. In a weighing scale a beam, a frame upon which the beam is fulcrumed, a scale pan pivotally mounted on the beam, an arm upon the scale pan extending laterally with respect to the beam, a vertical post upon the arm and a link pivoted to the post and to the frame.

3. In a device of the class described a beam, a frame upon which the beam is fulcrumed, a scale pan pivotally mounted on the beam, a bracket extending from the scale pan laterally of the beam and a link pivoted to the bracket and to the frame and extending parallel to the beam.

4. In a weighing scale a beam, a frame upon which the beam is fulcrumed, a scale pan pivotally mounted on the beam, a bracket extending laterally with respect to said beam and upwardly from the scale pan and a link pivoted to the bracket and to the frame.

5. In a weighing scale a beam, a frame comprising fulcra for said beam, a scale pan pivotally mounted upon the beam, a hollow member on the frame offset laterally of the beam, a bracket attached to the scale pan and extending within the hollow member, and a link pivoted to said bracket and to said member.

6. In a weighing scale a frame, a beam, a scale pan pivoted on the beam, a bracket extending laterally from the scale pan having a bearing substantially in a vertical plane perpendicular to the beam through the scale pan bearing, a bearing on the frame in a vertical plane substantially perpendicular to the beam through the fulcrum of the latter and a link connecting said bearings.

7. In a weighing scale a beam, a frame having fulcra on which the beam is mounted, a scale pan pivotally mounted on the beam, an arm upon the scale pan extending laterally with respect to the beam and thence upwardly, a bearing on the arm, a bearing on the frame, each bearing comprising two surfaces in substantially the same plane but facing in opposite directions, a link having at each end an outwardly and an inwardly directed knife edge, the knife edges on the link co-acting with the bearing surfaces.

8. In a weighing scale a beam, a frame having fulcra on which the beam is mounted, an automatic weight off-setting means connected to the beam, and a scale pan mounted thereon, a hollow arm extending from the frame and having a horizontal member and a vertical member and a laterally extending arm 28 connected to the scale pan and extending within said hollow arm, a vertical member 30 mounted upon the outer end of the arm 28 and a check link connecting said hollow arm and the vertical member near the upper end of the latter.

JOHN D. BURKHOLDER.

Witnesses:
CHAS. E. LONG,
C. A. TROST.